No. 706,613. Patented Aug. 12, 1902.
H. W. WAITE.
STEAM VALVE.
(Application filed May 4, 1901.)
(No Model.)
Fig. 1.
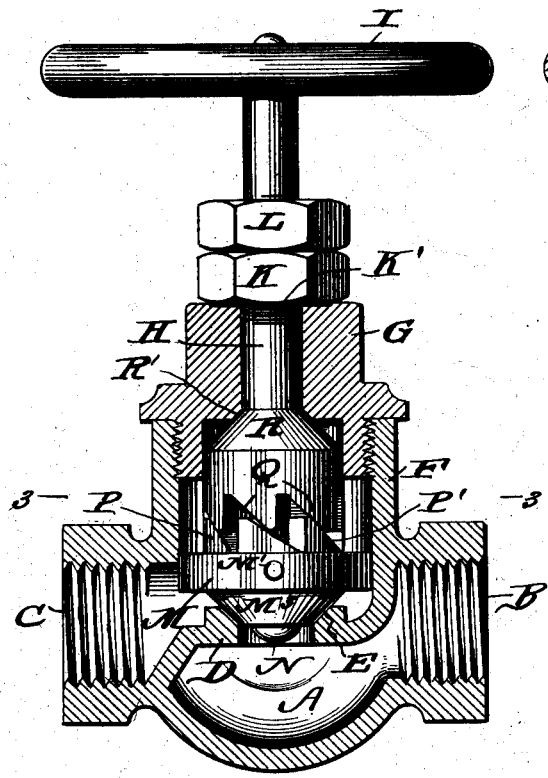
Fig. 2.
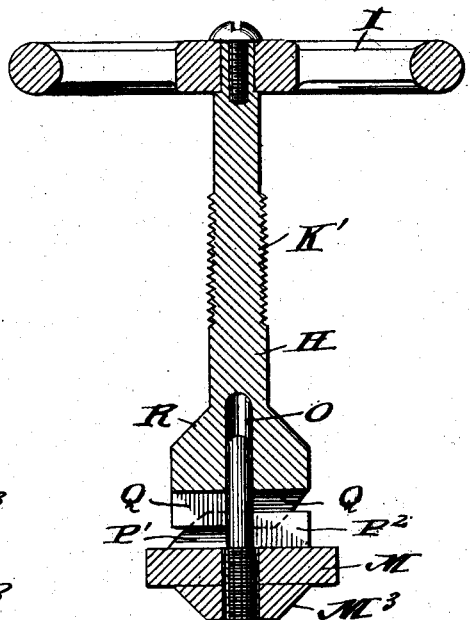
Fig. 3.
Fig. 4.
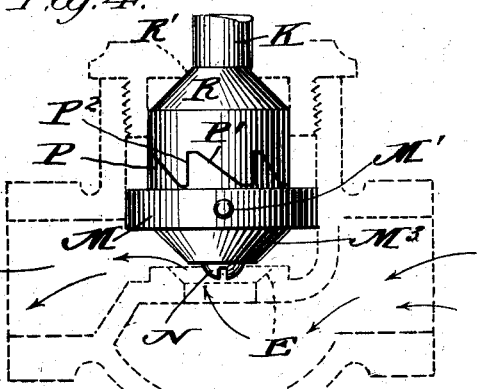
Inventor
H. W. Waite.
Witnesses
M. D. Blondell
Clarence Shaw
By
Attorneys

UNITED STATES PATENT OFFICE.

HENRY WILLARD WAITE, OF WOLLASTON, MASSACHUSETTS, ASSIGNOR OF ONE-HALF TO WILLIAM H. COX, OF WOLLASTON, MASSACHUSETTS.

STEAM-VALVE.

SPECIFICATION forming part of Letters Patent No. 706,613, dated August 12, 1902.

Application filed May 4, 1901. Serial No. 58,797. (No model.)

*To all whom it may concern:*

Be it known that I, HENRY WILLARD WAITE, a citizen of the United States, residing at Wollaston, in the county of Norfolk and State of Massachusetts, have invented a new and useful Steam-Valve, of which the following is a specification.

This invention relates generally to valves, and more particularly to a globe-valve for steam or water; and the object of this invention is to provide an exceedingly-quick-acting valve and one which will dispense with the use of a stuffing-box to prevent the escape of steam or water.

With these objects in view the invention consists, essentially, in providing the valve with a series of inclined-faced radial projections and in constructing the stem with similar and mating inclined portions; and the invention consists also in constructing the valve with inclined shoulders adapted to engage a beveled seat in the valved bonnet, thereby forming a tight joint to prevent the escape of steam, the inclined portions of the valve and stem riding one upon the other, serving to freely hold the shoulder on the stem against the seat when the valve is closed.

The invention consists also in certain details of construction and novelties of combination, all of which will be fully described hereinafter and pointed out in the claims.

In the drawings forming a part of this specification, Figure 1 is a sectional elevation showing the valve closed; Fig. 2, a detail sectional view of the valve and stem; Fig. 3, a sectional plan view on the line 3 3 of Fig. 1, and Fig. 4 a detail view showing the position of the parts when the valve is open.

In constructing a valve in accordance with my invention I employ the usual form of casing A, having inlet-opening B, outlet-opening C, and the central diaphragm D, having the valve opening and seat, all of which are of the usual construction. The casing is also formed with the threaded neck F, into which screws the bonnet G and through which passes the valve-stem H, having the hand-wheel I.

K indicates a nut which the threaded portion K' of the stem engages, and L indicates a jam-nut for holding the feed-nut K in its proper position. The valve M is adapted to work vertically without rotation, and in order to prevent such rotation I provide the guide-pins M', working in the grooves $M^2$, cut in the sides of the neck of the case. The valve M also has an inverted frusto-conical portion $M^3$, which seats or bears upon the valve-seat E when the valve is closed, and this frusto-conical portion $M^3$ may be integral with the valve M or it may be in the form of a disk attached thereto by means of a screw-pin N, said pin passing centrally up through the valve and into a central recess or socket O, produced in the valve-stem. The upper face of the valve is provided with a series of projections P, the faces P' of which are inclined, while the faces $P^2$ are straight. These projections P are arranged in radial order, as most clearly shown in Fig. 3, thereby virtually providing a ratchet-crown for the valve.

The lower end of the stem is enlarged so as to fit snugly within the tubular portion of the bonnet and within which it freely moves rotatively, the said stem being rotated through the medium of the hand-wheel. The lower face of the enlarged portion of the stem is notched or cut to provide a series of inclined depending projections Q, which correspond in general size, shape, and arrangement with the projections P, so that the said sections will mate or fit together, as most clearly shown in Fig. 4.

The shoulder between the enlarged portion of the stem proper is inclined and ground true, as most clearly indicated at R, said inclined shoulder being adapted to engage the seat R', ground upon the bonnet when the valve is opened or closed for the purpose of preventing the escape of steam, and thus doing away with stuffing-boxes commonly employed in connection with globe-valves.

In operation the valve proper is arranged upon its seat and the stem is fitted within the case and arranged so that its depending projections mate with the upwardly-extending projections carried by the valve. When the valve is closed, the stem is turned and the inclined projections of the stem are caused to ride upon the inclined projections of the valve, thereby forcing the valve tightly down upon its seat and also binding the inclined shoulder R tightly against its seat R', and thereby preventing the escape of steam or water.

In order to open the valve, the stem is turned to the left, the same as usual, and the valve proper will immediately move vertically a distance equal to the depth or height of the inclined projections, as most clearly indicated in Fig. 4, thereby clearing the valve-seat and permitting the steam to pass through the diaphragm.

It will thus be seen that I provide an exceedingly-quick-acting valve, one which will entirely avoid the use of stuffing-boxes and will effectively prevent the escape of steam.

Having thus fully described my invention, what I claim as new, and desire to secure by Letters Patent of the United States, is—

1. In a valve of the kind described, the combination with a case having a bonnet provided with an interior valve-seat, of a valve arranged within the case and having inclined projections upon its upper side, a valve-stem enlarged at its lower end and having inclined projections adapted to mate with the projections carried by the valve, the upper end of said enlarged portion being essentially conical in form and adapted to engage the seat of the bonnet, and a central guide-pin carried by the valve and projecting upwardly into the enlarged portion of the stem for the purpose described.

2. In a globe-valve, the combination with the casing, of a valve arranged therein and having radially-arranged incline-faced projections upon its upper side, said valve having a central and side guide-pins, the stem enlarged at its lower end and having radially-arranged depending projections corresponding with the projections carried by the valve, the shoulder of the enlarged portion being inclined and adapted to engage the seat upon the bonnet for the purpose of making a tight joint when the valve is either opened or closed, substantially as shown and described.

HENRY WILLARD WAITE.

Witnesses:
 GEO. F. PINKHAM,
 ISABELLA S. PINKHAM.